United States Patent
Olson et al.

(10) Patent No.: US 7,044,605 B2
(45) Date of Patent: May 16, 2006

(54) IMAGE-RENDERING DEVICE

(75) Inventors: Jorell A. Olson, Portland, OR (US); Robin F. Hoeye, Tigard, OR (US); Jason G. Lewis, Keizer, OR (US)

(73) Assignee: InFocus Corporation, Witsonville, OR (US)

( * ) Notice: Subject to any disclaimer, the term of this patent is extended or adjusted under 35 U.S.C. 154(b) by 122 days.

(21) Appl. No.: 10/453,865

(22) Filed: Jun. 2, 2003

(65) Prior Publication Data

US 2005/0105055 A1    May 19, 2005

Related U.S. Application Data

(63) Continuation-in-part of application No. 10/033,474, filed on Dec. 26, 2001, now Pat. No. 6,830,340.

(51) Int. Cl.
G03B 21/00    (2006.01)
G03B 21/14    (2006.01)
G03B 21/22    (2006.01)
G03B 21/26    (2006.01)
H04N 5/64     (2006.01)

(52) U.S. Cl. .................. 353/30; 353/119; 353/122; 348/744

(58) Field of Classification Search .......... 353/30, 353/31, 122, 71, 119; 348/14.01, 211, 212, 348/213, 744; 349/5, 8, 9
See application file for complete search history.

(56) References Cited

U.S. PATENT DOCUMENTS

| | | | |
|---|---|---|---|
| 6,137,794 A | 10/2000 | Brown | 370/360 |
| 6,489,934 B1 | 12/2002 | Klausner | 345/1.1 |
| 6,522,352 B1 | 2/2003 | Strandwitz et al. | 348/211.2 |
| 6,626,543 B1 * | 9/2003 | Derryberry | 353/119 |
| 6,812,954 B1 * | 11/2004 | Priestman et al. | 348/14.01 |
| 2001/0003479 A1 | 6/2001 | Fujiwara | 353/122 |
| 2002/0196378 A1 | 12/2002 | Slobodin et al. | 348/744 |
| 2003/0053033 A1 | 3/2003 | Yrachan et al. | 353/31 |
| 2004/0091232 A1 * | 5/2004 | Appling, III | 386/46 |

* cited by examiner

*Primary Examiner*—Melissa Jan Koval
(74) *Attorney, Agent, or Firm*—Alleman Hall McCoy Russell & Tuttle LLP

(57) ABSTRACT

An image-rendering device including a body, a connector movably coupled to the body, wherein the connector is configured to electrically and structurally couple the body to the projection device such that the body is movable relative to the connector, and an image receiver associated with the body is provided. The image receiver is adapted to alternatively receive first and second interchangeable data transfer devices, wherein each interchangeable data transfer device is configured to allow transfer of data representing an image to the image-rendering device. The image-rendering device also includes a processor and memory, wherein the memory includes a set of instructions executable by the processor to render the image from the data and to provide the image to the projection device.

18 Claims, 10 Drawing Sheets

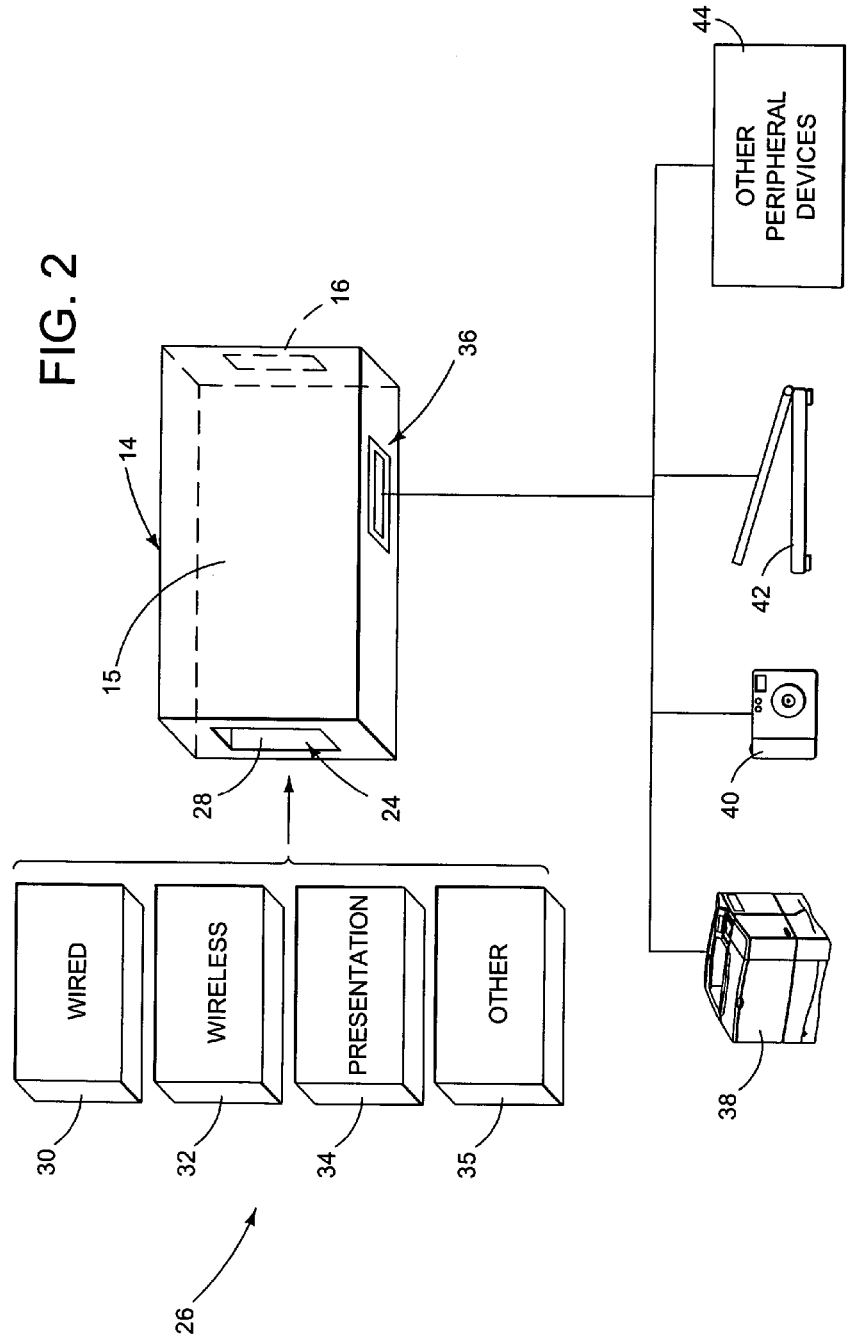

IMAGE-RENDERING DEVICE

CROSS-REFERENCE TO RELATED APPLICATION

This application is a continuation-in-part of U.S. patent application Ser. No. 10/033,474, filed Dec. 26, 2001 now U.S. Pat. No. 6,830,340, which is hereby incorporated by reference in its entirety.

BACKGROUND

Image projectors have become a popular method to present a presentation to an audience and are used for both personal and business purposes. These image projectors typically are used to project a computer image and/or presentation onto a viewing surface.

Some image projectors are configured to enable a user to access a presentation by coupling their computer to the projector. Typically, a user must physically connect their computer, such as a personal computer, to the image projector. This process may be cumbersome and frustrating to a presenter. For example, there may be compatibility issues between the hardware and software on the computer and on the image projector. Moreover, connection to the image projector may require numerous cables and/or adapters to enable connection of the user's computer with the available projector. It is not unusual for the cables and adapters to get lost or become misplaced.

Thus, it may be difficult for multiple presenters to use the same projector. For example, when transitioning from a first presenter to a second presenter, the first presenter must physically connect a computer to an image projector using the appropriate adapters and cables. The first presenter then typically seats himself or herself close to the image projector. When the second presenter wants to present their presentation, the first presenter may have to disconnect the computer from the image projector, enabling the second presenter to connect a new computer to the image projector possibly using different adapters and cables. Typically, the first presenter may have to change seats with the second presenter to provide room for the second presenter to connect to the image projector. This transition between the first and second presenter may take a significant period of time and be disruptive to a meeting.

What is needed is a portable and easy-to-use device that enables multiple users to easily connect to an image projector, regardless of the computing platform used by the user or the storage location or format of the presentation. Moreover, it would be useful if a presenter could run a presentation from anywhere in a room. Furthermore, it would be useful if the device enabled other peripheral devices, such as printers, scanners, cameras, etc. to be easily connected to the image projector.

SUMMARY

An image-rendering device for a projection device is provided. The image-rendering device includes a body, a connector movably coupled to the body, wherein the connector is configured to electrically and structurally couple the body to the projection device such that the body is movable between at least a first position and a second position relative to the connector, and an image receiver associated with the body. The image receiver is adapted to alternatively receive a first interchangeable data transfer device and a second interchangeable data transfer device, wherein each interchangeable data transfer device is configured to allow transfer of data representing an image to the image-rendering device. The image-rendering device also includes a processor disposed within the body, and memory disposed within the body and in electrical communication with the processor, wherein the memory includes a set of instructions executable by the processor to render the image from the data and to provide the image to the projection device.

BRIEF DESCRIPTION OF THE DRAWINGS

FIG. 2 is a schematic diagram of the image-rendering device of FIG. 1.

DETAILED DESCRIPTION OF THE PREFERRED EMBODIMENTS

Figure 1:
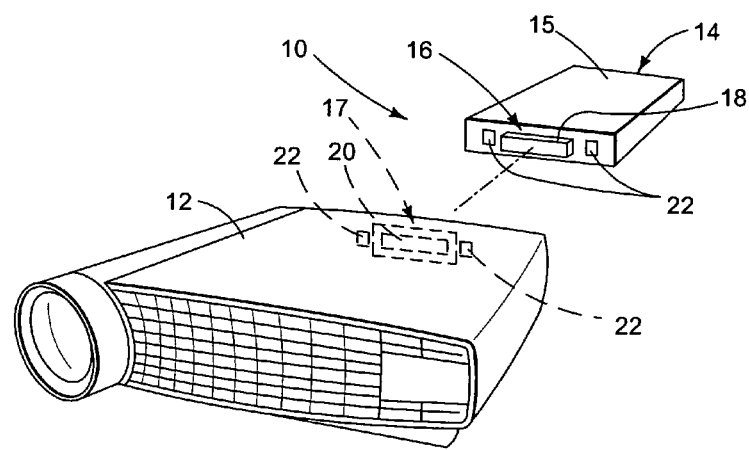
FIG. 1 is an exploded isometric view of an image projector and an image-rendering device according to one embodiment of the present invention.

Referring initially to FIG. 1, an image display system is shown generally at 10. Image display system 10 typically includes an image projector or visual presentation projector 12 and an image-rendering or image-transformation device 14. Briefly, image-rendering device 14 is operably coupled to image projector 12, such that images are transferred from image-rendering device 14 to image projector 12 for presentation on a projection or viewing surface. Image-rendering device 14 is adapted to receive images from a plurality of different sources and is further adapted to automatically transmit a projectable image to image projector 12.

Image projector 12 may be any suitable display device, including, but not limited to, liquid crystal display (LCD) projectors, digital light processing (DPL) projectors, etc.

Image-rendering device 14 includes a body 15. Body 15 is configured to be selectively inserted at least partially within an attachment slot 17 in image projector 12. Specifically, body 15 includes a projector connecter 16. Projector connector 16 functions to couple image-rendering device 14 to image projector 12. Projector connector 16 further functions to transmit or transfer a projectable image to image projector 12. As illustrated in FIG. 1, projector connector 16 may include a plug 18 that is adapted to be received into a corresponding outlet 20 in image projector 12, permitting image-rendering device 14 to directly engage or plug into image projector 12. Attachment structures, including latches 22, projections, pins, tabs, braces, screws or other suitable supports, may be used to retain image-rendering device 14 within outlet 20. Alternatively, instead of an integral connector, projector connector 16 may be attached to projector 12 in a remote fashion via a cable and suitable plug.

Any suitable plug may be implemented in the present invention. One example of a suitable projector connector is a standard video plug. Use of a standard video plug may enable image-rendering device 14 to be used on a variety of image projectors having a standard outlet. For example, projector connector 16 may be a Video Electronics Standard Association (VESA) M1 plug that corresponds to an M1 standard video interface, which is available on numerous image projectors. For example, the M1 plug may be any display receptacle interface, such as, but not limited to, a digital connector, e.g. an M1-D connector, an analog connector, e.g. an M1-A connector, or a digital and analog connector, e.g. an M1-DA connector.

Image-rendering device 14 may utilize any suitable power supply. For example, projector connector 16 may include a power supply enabling image-rendering device 14 to draw power from connector 16. An example of such a projector connector is the VESA M1 plug described above. Furthermore, projector connector 16 may be capable of supporting both analog and digital display requirements.

Turning now to FIG. 2, image-rendering device 14 may be understood in more detail. Specifically, body 15 of image-rendering device 14 may include at least one image receiver 24 configured to receive a plurality of different data transfer devices 26, examples of which are depicted at 30, 32, 34 and 35. Each data transfer device is adapted to provide an image, presentation, slide or other type of data to be transferred to image-rendering device 14 from an independent source, e.g. an external computer or a mass storage device. An external computer, as discussed in more detail below, includes any suitable computing device, including, but not limited to, a personal computer, a desktop computer, a laptop computer, a handheld computer, etc.

Data transfer devices 26 enable image-rendering device 14 to receive images from multiple sources. Data transfer device 26 may be a card, an expansion board, an adapter or other suitable device that is adapted to be plugged into a slot 28 within image-rendering device 14. It should be noted that slot 28 is configured to enable different cards to be quickly and easily inserted and removed from image-rendering device 14. Slot 28 may be of a suitable size, such that standard-sized cards may be inserted, or adapted to be inserted, into slot 28.

Any number of different data transfer devices 26 may be interchangeably received within slot 28. For example, data transfer device 26 may be a network interface card, such as a wired network card, indicated schematically at 30, or a wireless network card, indicated schematically at 32. Specifically, wired network card 30 may include an IEEE 802.3 standard wired local area network (LAN) interface card, e.g. Ethernet, 100BASE-T standard (IEEE 802.3u) or fast Ethernet, IEEE 802.3z or gigabit Ethernet, and/or other suitable wired network interface. Wireless network card 32 may include a wireless LAN card, such as IEEE 802.11a, 802.11b, 802.11g, 802.11x, a radio card, a Bluetooth radio card, a ZigBee radio, etc.

Each network interface card, regardless of type, enables communication between device 14 and an independent source, e.g. a remote computer, server, network, etc. This communication allows an image or presentation stored on the independent source to be transmitted to image-rendering device 14. Examples of specific implementations of different network interface cards within image-rendering device 14 are described in more detail following the description of FIGS. 2 and 3.

Slot 28 may also be configured to accept other types of data transfer devices. For example, data transfer device 26 may be a presentation card, indicated schematically at 34. Presentation card 34 may be any suitable type of mass storage device. For example, presentation card 34 may be a memory card, a flash memory card, a solid-state memory card, a hard-disk, etc. A user may insert a presentation card having a prestored presentation into image receiver 24. The prestored image may then be automatically transferred to image projector 12. Alternatively, a user may be able to navigate a menu displayed on the viewing surface in order to select a presentation. Such a configuration may be especially helpful if more than one presentation is stored on the presentation card.

Software may be provided within image-rendering device 14 to enable the device to convert and render prestored images into projectable images. For example, software may be provided in the device to enable a prestored presentation to be presented with dynamic graphics and other animations. Specifically, presentations may be stored in a primitive graphical format and/or in a compressed format and decompressed or otherwise rendered by image-rendering device 14 into a projectable image.

A further application for use of a presentation card within image-rendering device 14 may be best illustrated with reference to a standard digital camera. Typically, standard digital cameras include some type of memory device, such as a non-volatile memory card, or other mass storage device, that stores digital pictures. Image receiver 24 may be configured to receive such a memory device such that the pictures stored in the memory card and/or mass storage device may be presented by image projector 12. Furthermore, image-rendering device 14 may be configured to render the images from the memory card to simulate a slide show. Additionally, it should be noted that a user may be able to order, animate, insert transitions and/or otherwise alter the pictures when presenting the slide show.

Image-rendering device 14 further may include at least one peripheral device connector 36 on body 15. Peripheral device connector 36 is configured to enable at least one peripheral device to be operably linked to image-rendering device 14 to enable images to be transferred from a peripheral device to image projector 12 or vice versa. Peripheral connector 36 may be any suitable connector. For example, peripheral connector 36 may be a standard connector, such as a Universal Serial Bus (USB) port, IEEE 1394 port, parallel port, e.g. enhanced parallel port (EPP), extended capabilities port (ECP), etc. It should be noted that more than one peripheral connector may be provided on body 15.

As illustrated, any number of peripheral devices may be coupled to image-rendering device 14 via peripheral connector 36. Exemplary peripheral devices may include, but are not limited to, printers 38, cameras 40, scanners or document cameras 42 and other peripheral devices 44. As discussed above, images may be transferred from any one of the peripheral devices to image projector 12 or vice versa. In this manner, scanned images may be transferred to image-rendering device 14 and projected onto an image projection surface via image projector 12. Similarly, pictures residing within camera 40 may be transmitted directly from the camera to image projector 12 and projected onto an image projection surface. Additionally, a projected image or presentation may be relayed back through image-rendering device 14 and printed by printer 38.

Figure 3:
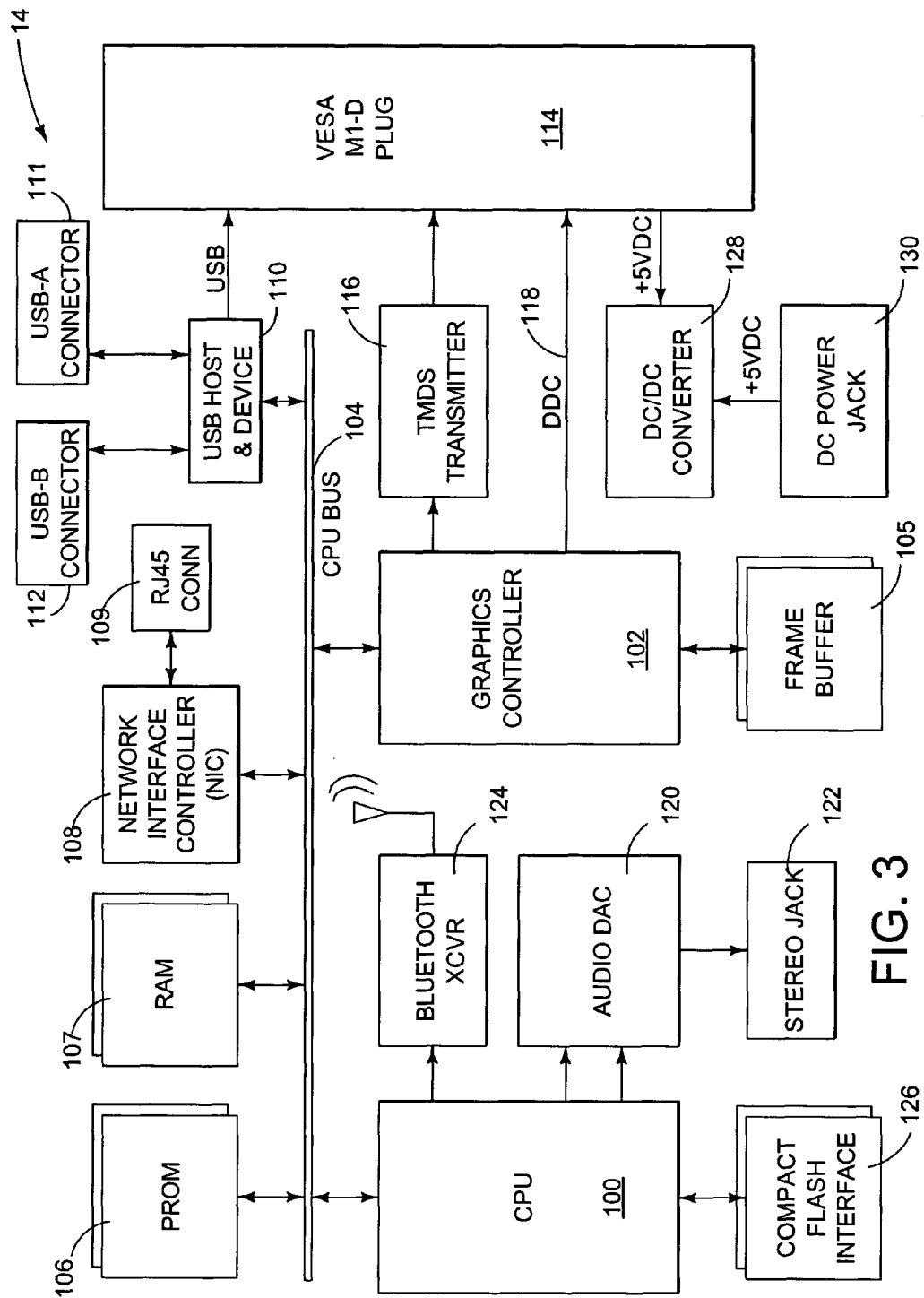
FIG. 3 is an exemplary block diagram of the image-rendering device of FIG. 2.

FIG. 3 illustrates a block diagram of an exemplary electrical and logic system for one embodiment of the present invention. It should be noted that this diagram is for illustrative purposes and is not intended to limit the scope of the invention. Specifically, image-rendering device 14 includes a central processing unit (CPU) or processor 100 configured to automatically transmit images from the image receiver and/or the peripheral connector to the image projector for display. Transmitting the images may include rendering and/or decompressing images depending on the format of a received image.

Processor 100 is connected to a graphics controller 102 via a bus 104. Graphics controller 102 is adapted to process and produce images that may be projected by image projector 12. Buffer 105 is linked directly to graphics controller 102 and provides temporary memory for graphics controller 102. Image-rendering device 14 further includes memory, such as programmable read-only memory (PROM) 106 and random access memory (RAM) 107, linked to processor 100 and graphics controller 102 by bus 104. PROM 106 and RAM 107 may be utilized to store a set of instructions executable by graphics controller 102 to process and produce the image for projector 12. Other types of memory may also be utilized.

Peripherals, including a network interface card 108 (including connector 109) and USB host 110, are further linked to processor 100 and graphics controller 102 by the same bus 104. USB host 110 may be linked to USB-A connector 111 and/or USB-B connector 112 and may be further linked directly to the M1-D plug 114. It should further be noted, that graphic controller 102 may be linked to M1-D plug 114 via an analog interface and/or a transition minimized differential signaling (TMDS) transmitter 116. Graphic controller 102 is further linked to M1-D plug 114 via a display data channel 118.

Additionally, an audio converter is illustrated at 120 with attached stereo jack 122 to allow audio output through external speakers and/or internal speakers. Provision is made for accommodation of a Bluetooth radio card via a Bluetooth transceiver 124. A compact flash interface 126 is also provided to allow a compact flash card or other data transfer device, such as 30, 32, 34 and 35 shown in FIG. 2, to be inserted and used within slot 28.

As described above, image-rendering device 14 may be powered from the VESA M1 interface from the image projector via M1-D plug 114 or other similar device. A power converter 128 may be further utilized within the system. Alternatively, power may be provided via power jack 130.

Figure 4:
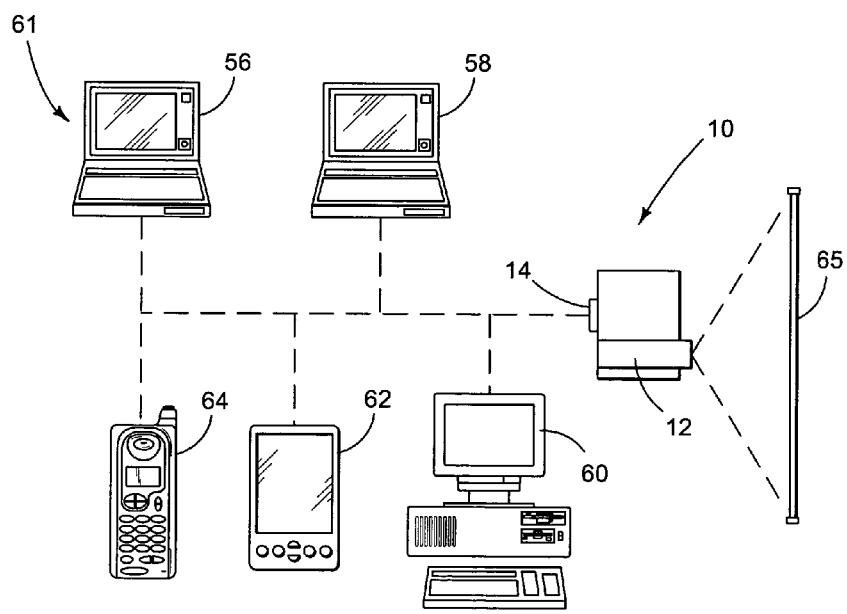
FIG. 4 is a graphical representation of an exemplary use environment in which an embodiment of the present invention may be implemented.

FIG. 4 illustrates an exemplary use environment in which image-rendering device 14 may be implemented. Specifically, image-rendering device 14 is shown in a network environment 61. Network environment 61 may include a plurality of different devices, such as computers, laptops, servers, handheld computers, etc. The insertion of an appropriate network card into image-rendering device 14 enables presentation content on each of the network devices to be selectively transmitted to image-rendering device 14 for display by image projector 12. As shown, image projector 12 may display the transferred image onto a display surface 65.

As described above, the network interface card may be either a wireless network card or a wired network card. A wireless network card 32, as shown in FIG. 2, may be adapted to be selectively received and removed from slot 28. It should further be appreciated that wireless network card 32 may be permanently integrated within image-rendering device 14 without departing from the scope of the invention. Wireless network card 32 enables a plurality of users to alternatively link to the local area network and send images/presentations to an image projector without individually having to manually couple their computer to a projector. Additionally, as long as a user's computer device is capable of linking to the local area network using standard protocols and transferring data, the type and model of the computer linked to device 14 is irrelevant. No adapters or cables are necessary for the wireless connection. Thus, users may be able to present from any location in a room.

Such a system is particularly useful in meeting room environments, where multiple individuals using the same projector system for presentations may be using different operating systems and/or platforms. For example, in FIG. 4, five computers, two portable computers or laptops 56 and 58, a desktop computer 60, a handheld computer 62, and a telephone 64, are shown linked to device 14 over a wireless LAN. Any of the users may link to image projector 12 via image-rendering device 14 wirelessly. Usually, the user who is presenting or the active presenter must release or exit from the currently active presentation to enable a second presenter to begin sending data to device 14 for presentation.

It should be understood that any suitable computer or computing device that is capable of wirelessly linking to the local area network and conveying an image, or the URI or other indicator of the location of an image, to device 14 may be used in the present invention. Computers, as used herein, include, but are not limited to, desktop computers, handheld computers, laptop computers, servers, mainframes, telephones, etc.

Figure 5:
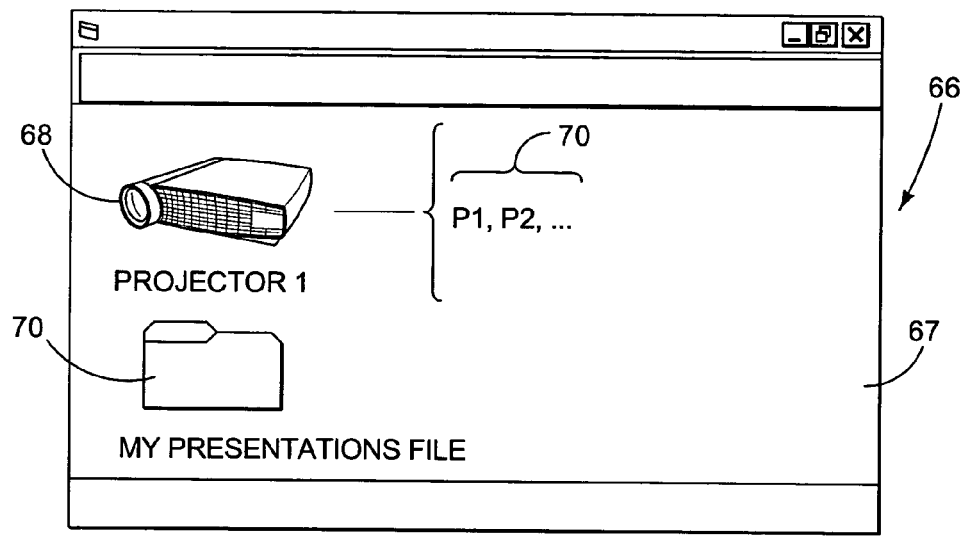
FIG. 5 is a representative user interface for the system depicted in FIG. 1, showing a projector selection window.

Device 14 enables the transfer of data to image projector 12 by connecting a user's computer with an image projector. In some embodiments, device 14 may communicate the name of the projector to which it is coupled to the user's computer. Thus, when a user connects to a network on which the projector is located, the project may appear as an icon, or be added to a list of projectors to which the computer may be connected. In this situation, the user may select the projector from the list of projectors to connect to a specific image projector. An exemplary user interface is shown in FIG. 5. The exemplary user interface includes a selection window 66 for display on a computer screen 67, but other formats are possible. The user interface includes a projector icon 68. Such an icon may be used to identify the projector that is currently available on the network. For example, and as shown in FIG. 5, "Projector 1" is linked to the user's computer via device 14. Alternatively, a user may be able to select the desired projector from a list of projectors 70.

The user interface also may include a presentations file 72 configured to allow a user to store presentations or images for display. When a user desires to present a presentation, a local wireless network card may be inserted into image receiver 24 within image-rendering device 14. The name or identifier for the linked projector may then be broadcasted to the user's computer indicating that the user can connect to the image projector and send images and/or presentations to device 14. The user may then select a presentation from presentation file 72 and direct it to the linked projector via projector icon 68. The user does not need to physically move his/her computer next to image projector 12, nor does the user have to plug adapters or cables into his/her computer to connect to the image projector. Instead, the user simply connects to the wireless network and directs a desired image or presentation to the projector. The user may remain seated the entire time and does not need to move to a position near the projector when presenting.

As discussed above, images may be transmitted from a user's computer to device 14 in many different formats. For example, an image file corresponding to the appearance of the display on the user's computer (screen shots or scrapes) may be sent to device 14. Typically, the screen shots will be sent to device 14 in a compressed form and decompressed at the device. Alternatively, uncompressed data may be sent to device 14. The type of compression may depend on the type of image. For example, photographic images may be compressed with a compressor suited for low spacial frequencies, while text may be compressed with a compressor suited for high spatial frequencies.

The use of screen-scraping may have some inherent limitations regarding graphics capabilities when sending screen shots to image-rendering device 14. Specifically, bandwidth limitations may hinder the ability to rapidly transmit and render complex and/or dynamic graphics to the image projector. Similarly, animations may be difficult to present using the screen-scraping format.

Image data may be transferred in other formats using a reduced amount of transmission bandwidth. For example, images on the user's computer may be reduced into graphic primitives, which are much smaller files than the screen shots, and then transmitted to image-rendering device 14. Sending graphic primitives will minimize the bandwidth requirements. For example, the presentations may be reduced into a compressed video formats, including, but not limited to, web standards developed by the World Wide Web Consortium (W3C), e.g. scalable vector graphics (SVG), Dynamic Hypertext Markup Language (DHTML), Extensible Markup Language (XML) or XML-like formats, Synchronized Multimedia Integration Language (SMIL™), etc. It also should be noted that non-W3C formats also may be used, including Vector Markup Language (VML), etc. Corresponding software may be included on image-rendering device 14, such that the images may be rendered and displayed on image projector 12.

Exemplary methods suitable for use with the present invention, for wirelessly transmitting images to an image projector are further disclosed in co-pending U.S. patent application Ser. No. 877909, entitled "METHOD AND APPARATUS FOR WIRELESS IMAGE TRANSMISSION TO A PROJECTOR" filed Jun. 7, 2001 by Slobodin, Hoeye, Olson, Long, Girardelli and Duffy, the disclosure of which is hereby incorporated by reference.

It should be noted that in some embodiments, the user's computer may send the image data directly to image-rendering device 14. Alternatively, the user computer may send a universal resource indicator (URI) to image-rendering device 14, which directs device 14 to the appropriate location to pick up the desired image/presentation.

Image-rendering device 14 also may provide for the capability of a user to control aspects of the presentation via a control device connected to the image projector. For example, image projector 12 may include a remote control or other user device to enable a presenter to control the image projector. In this case, device 14 may send instructions entered into the remote control or other device to the user's computer. Such a configuration allows a user to control the computer via the remote control device.

As discussed above, a wired network card 30 also may be received within image receiver 24. Use of wired network card 30 enables image-rendering device 14 to be physically connected to the user's computer via a wired interface. Thus, when wired network card 30 is retained within slot 28, any one of the computers 56, 58, 60, 62, 64 illustrated in FIG. 4 may be linked to image-rendering device 14 by connecting the computer to the same network, through a physical connection, such as a cable or fiber optic connection. It will be appreciated that a wired network card may be permanently integrated within image-rendering device 14 without departing from the scope of the present invention.

The use of a wired network card within image-rendering device 14 enables a user to link into any suitable network, including, but not limited to, a local area network (LAN) or a wide area network (WAN), public (e.g. the Internet) or private networks, etc. In one application, a user may use the image-rendering device to browse the Internet. For example, the user may locate presentations and select the desired presentation using a remote device or other suitable user device linked to image projector 12. In another application, image-rendering device 14 may act as a client, e.g. a thin client, wherein the user computer provides the server software and the image-rendering device provides the client software. In such an application, the bulk of the processing may occur on the user computer. Furthermore, the wired network card may enable a remote server to provide the presentation via a client/server session between the image-rendering device and the remote server.

Figure 6:
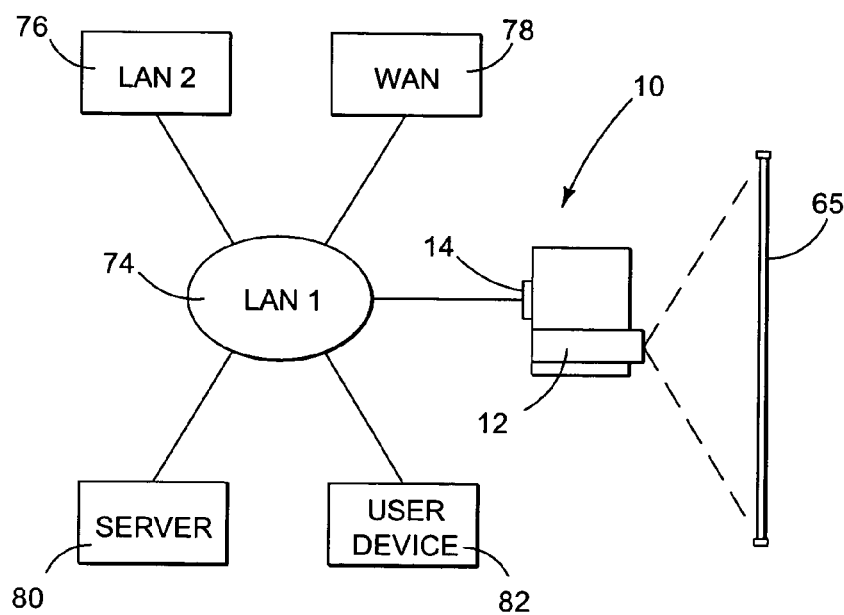
FIG. 6 is a schematic diagram of another exemplary use environment in which an embodiment of the present invention may be implemented.

An exemplary network environment in which the present invention may be implemented is shown in FIG. 6. As illustrated, image-rendering device 14 may be connected directly to a LAN 74 via a wired and/or wireless network card. Image-rendering device 14 may be further linked to a second LAN 76 and/or a WAN 78, such as the Internet, through LAN 74. Image-rendering device 14 also may be able to connect to a remote server 80 or user 82 via LAN 74. Such a configuration may enable a user to run a presentation on image projector 12 from a remote location.

It should be noted that image-rendering device 14 is compact and portable. Typically, image-rendering device 14 is much smaller and lighter than a conventional laptop. Moreover, no user input device, such as a keyboard or mouse, is necessary. The device is an automatic rendering engine configured to automatically render and transmit images from a first source to an image projector for display.

Figure 7:
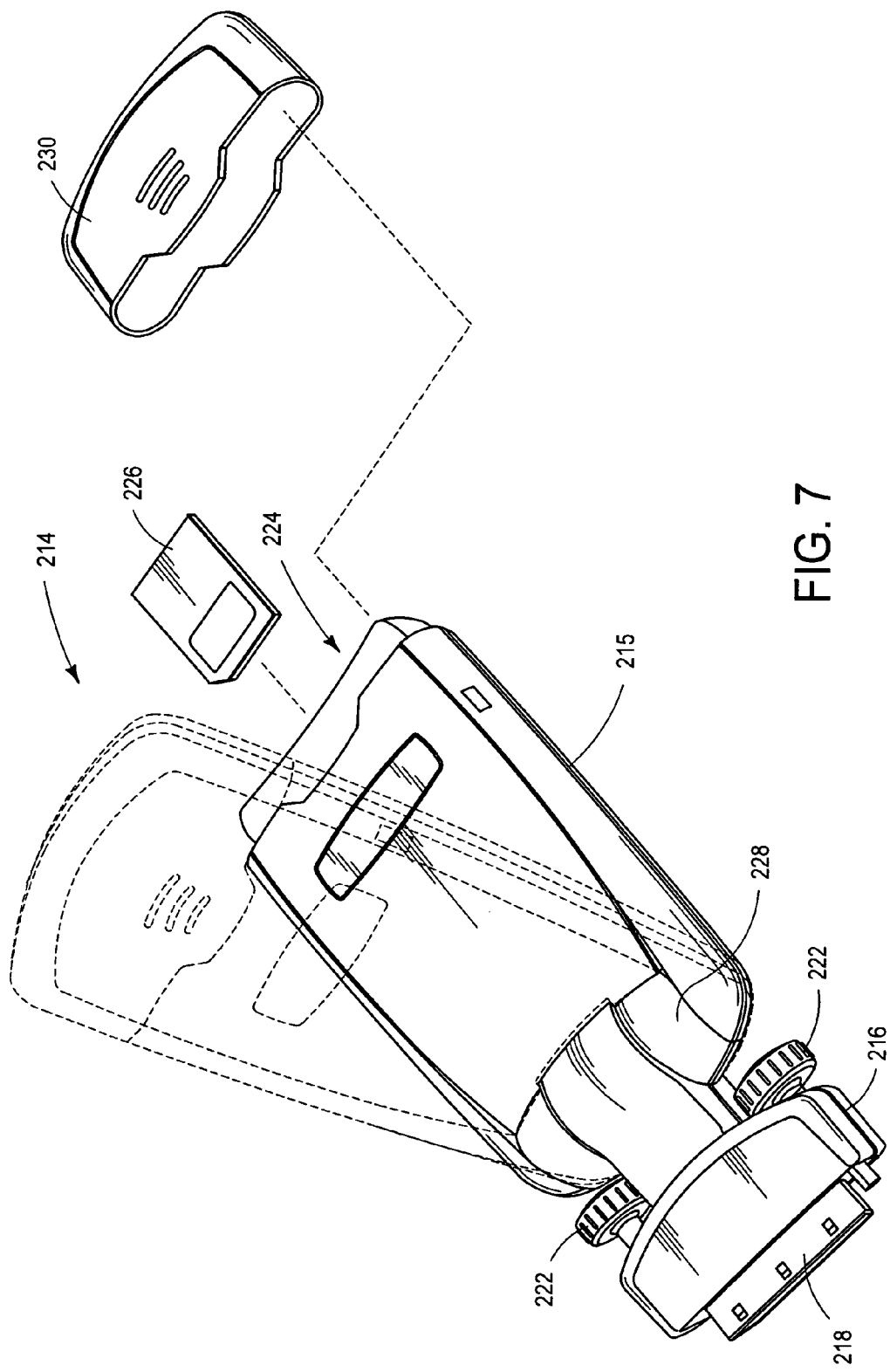
FIG. 7 is an exploded isometric view of an image-rendering device according to another embodiment of the present invention

FIG. 7 shows, generally at 214, a second embodiment of an image-rendering device according to the present invention. Image-rendering device 214 includes a body 215 connected to a connector 216. Connector 216 is configured to be connected to a suitable projection device, such as image projector 12, to enable the transfer of data between the projection device and image-rendering device 214. Connector 216 may include a plug 218 configured to be coupled with a complementary connector (not shown) on the projection device. Connector 216 may also include one or more fasteners 222 configured to selectively secure connector 216 to the complementary connector on a projection device. Examples of suitable fasteners include, but are not limited to, screws, bolts and clips.

Connector 216 is connected to body 215 via a movable connection. This allows body 215 to be positioned in at least a first position and a second position (indicated in solid lines and dashed lines, respectively, in FIG. 7) relative to the connector. Body 215 may also be movable between more than just two positions relative to connector 216. The movable connection between body 215 and connector 216 allows the body 215 may be re-positioned as desired when the connector is attached to a projection device. This is explained in more detail below.

Image-rendering device 214 also includes an image receiver 224 configured to receive a data transfer device 226. As with image receiver 24, described above, image receiver 224 may be configured to receive a number of different types of data transfer devices, including but not limited to a wired or wireless network interface card, a mass storage device such as a FLASH memory card or a disk drive, or any of the other data transfer devices described above in the context of image receiver 24.

Figure 8:
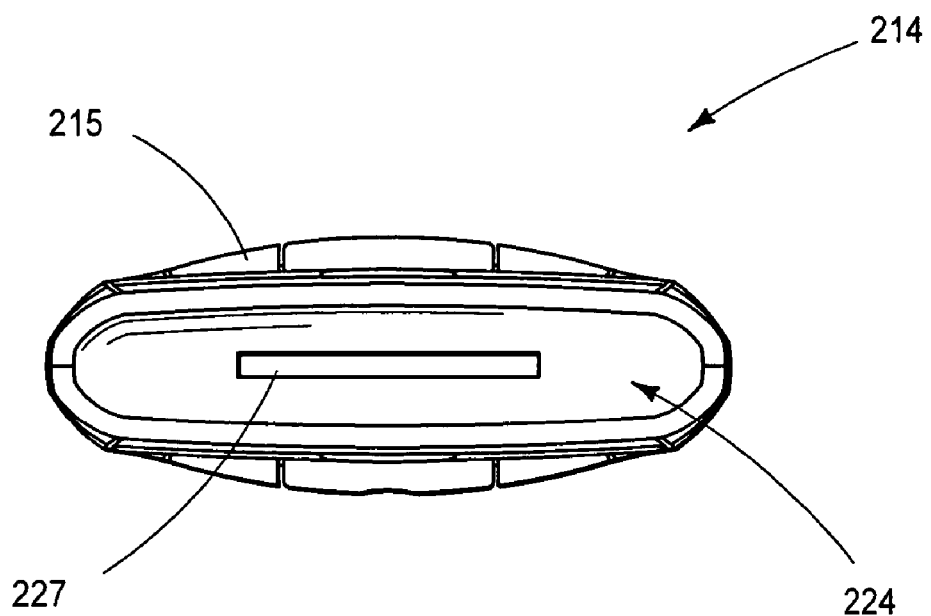
FIG. 8 is an end view of the embodiment of FIG. 7.

Image receiver 224 may take any suitable form. For example, image receiver 224 may include a slot or other suitable opening configured to accept the data transfer device, as shown at 227 in FIG. 8. Furthermore, a protective cover 230 may be provided to protect slot 227 from dust, etc., as well as to help prevent the accidental removal of data transfer device 226 from slot 227. Protective 230 may either be opaque, or may be at least partially transparent or translucent to allow a user to determine whether a data transfer device 226 is positioned within slot 227 without having to remove the protective cover. The electrical system of image-rendering device 214 may otherwise be substantially similar to that described above in the context of FIG. 3, and thus is not discussed in further detail.

The use of a movable connection between body 215 and connector 216 may offer advantages over the use of a fixed connection between these components. For example, in use environments having more than one projection device, such as a large business organization or university, a single image-rendering device 214 may be used with a plurality of different projection devices within the organization. Some of the projection devices may be ceiling-mounted units, while others may be table-mounted units, and yet others may be portable units. Where a projection device is mounted to a ceiling, it may be difficult to insert or remove data transfer device 226 where slot 227 is oriented horizontally to the ceiling. However, providing a movable connection between body 215 and connector 216 enables a user to move body 215 to a position that facilitates the insertion of a data transfer device into slot 227. Likewise, for table-mounted and portable units, the movable connection between body 215 and connector 216 also allows a user to adjust the body as desired to increase the ease of use of image-rendering device 214.

Body 215 and connector 216 may be movably coupled in any suitable manner. In the depicted embodiment, body 215 and connector 216 are coupled together via a hinged connection 228. Hinged connection 228 may be configured to be continuously adjustable, or may be configured to be adjustable in an indexed manner. Where hinged connection 228 is adjustable in an indexed manner, body 215 may be adjusted to a plurality of discrete positions relative to connector 215. Alternatively, where hinged connection 228 is continuously adjustable, body 215 may be adjusted to any position within the range of motion of body 215 relative to connector 216. Other suitable types of movable connections between body 215 and connector 216 besides hinged connections include, but are not limited to, multi-axis connections, such as ball-and-socket connections.

Hinged connection 228 may be configured to have any suitable range of motion. For example, hinged connection 228 may have a range of motion of approximately ninety degrees. This range of motion may allow a long dimension of body 215 (parallel to the direction in which data transfer device 226 is inserted into slot 217) to be oriented approximately perpendicular to the major face of a projection device to facilitate use of the image-rendering device in a ceiling-mounted orientation, while also allowing body 215 to be oriented at a lesser angle for use with a table-mounted device. Alternatively, hinged connection 228 may have either a greater or lesser range of motion, from greater than one hundred eighty degrees to only a few degrees.

In some use environments, more than one image-rendering device 14 (or 214) may be accessible to a user. For example, in the network context, more than one image-rendering device 14 and associated projection device may be connected to the network. Moreover, in the wireless local area network (WLAN) context, more than one WLAN to which a user may connect may be available, and each WLAN may have a plurality of projection devices, each connected to the WLAN with an associated image-rendering device 14.

Where multiple projection devices are available to a user over a network, a user's computer may include a user interface program that allows a user to discover image-rendering devices 14 and associated projection devices that are connected to a LAN, and to allow the user to connect to a desired image-rendering device and associated projection device over the LAN. The methods employed by the user interface are described below in the context of a WLAN, but it will be appreciated that the concepts may be extended to any other network environment. Furthermore, while the methods are described below in the context of image-rendering device 14, it will be appreciated that the discussion applies equally to image-rendering device 214.

Figure 9A:
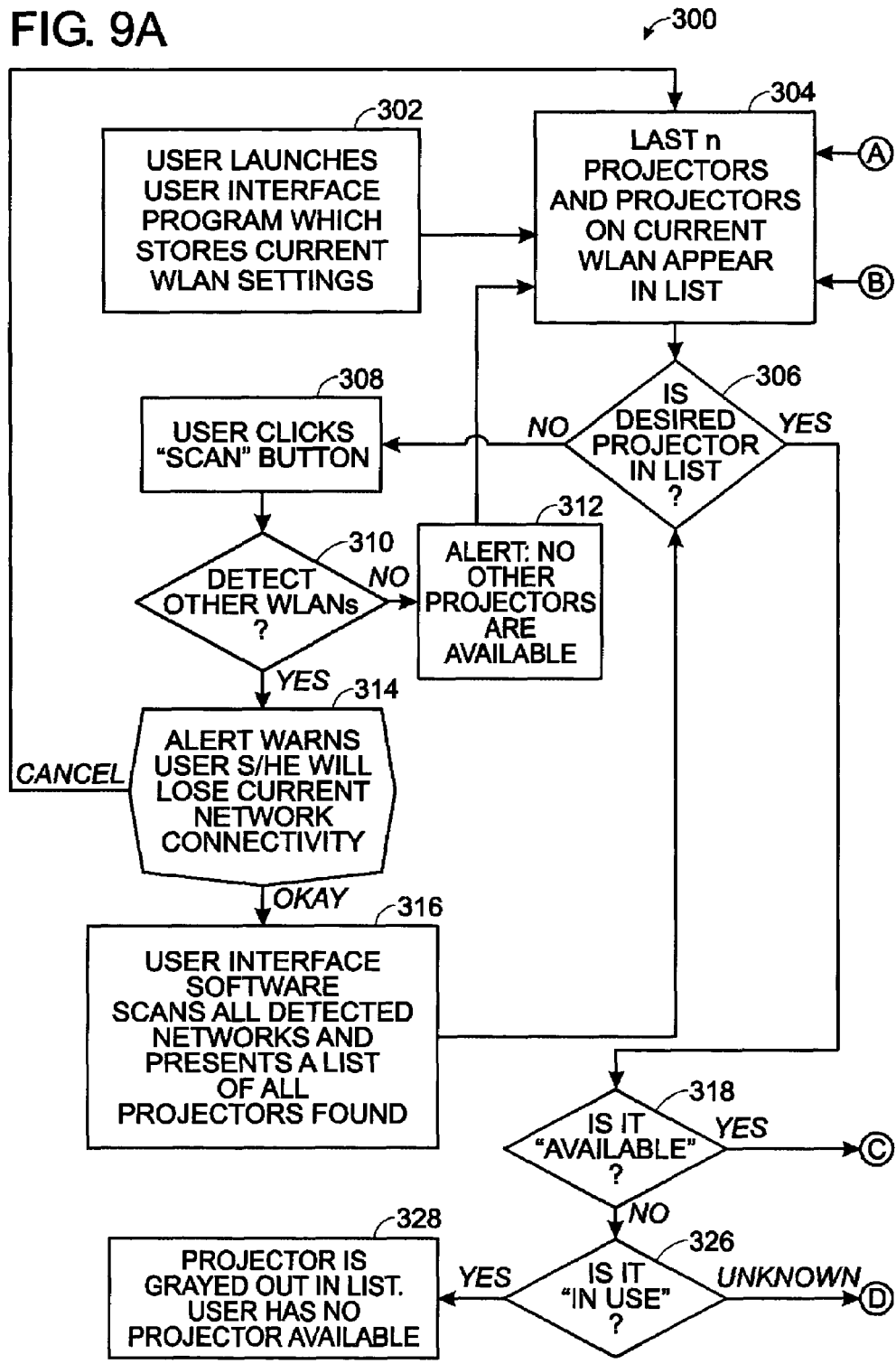
FIG. 9A is a first portion of a flow diagram showing an embodiment of a method of locating one or more image-rendering devices over a wireless network according to the present invention.
Figure 9B:
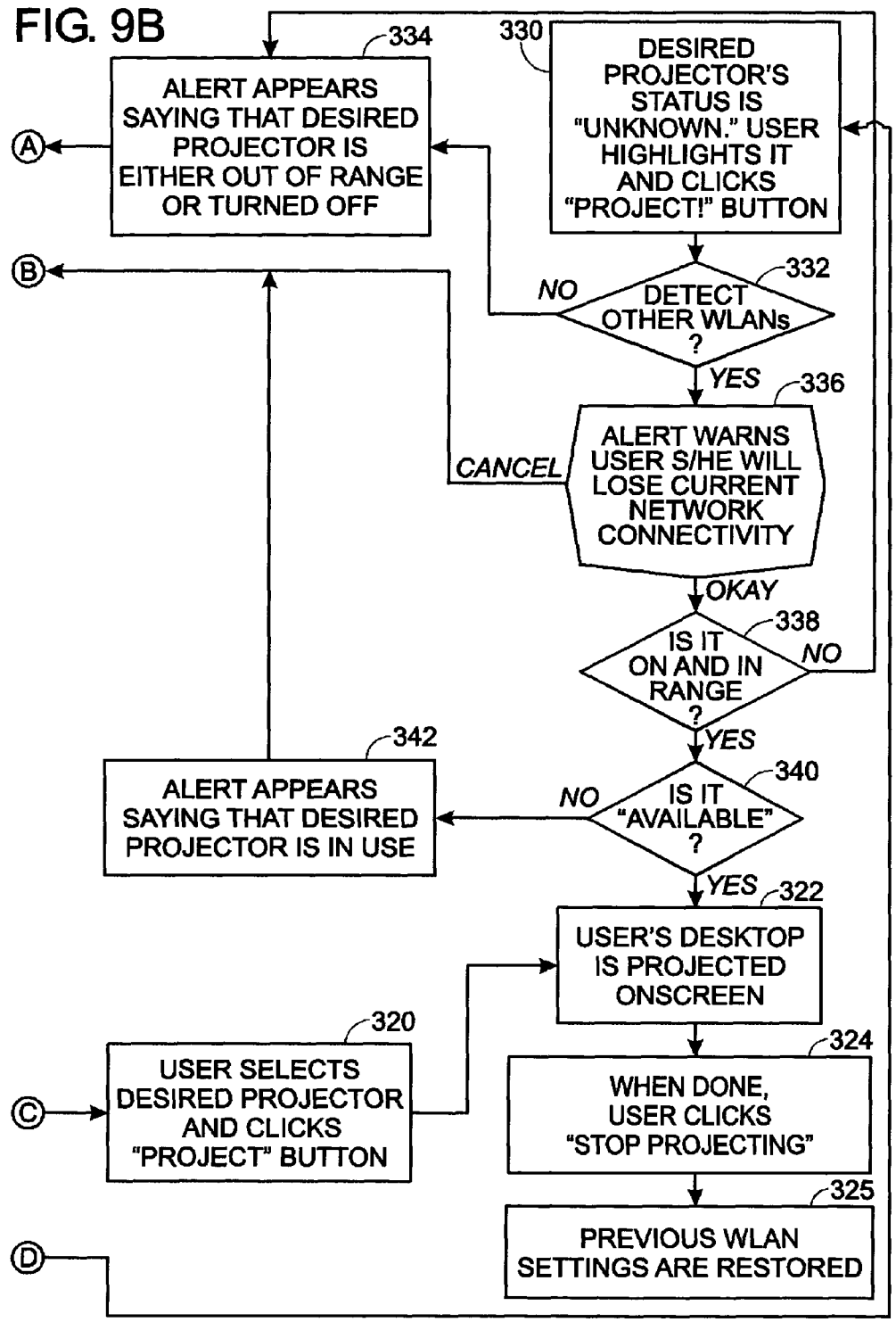
FIG. 9B is a second portion of the flow diagram of FIG. 9A.

FIGS. 9A and 9B show, generally at 300, one embodiment of a suitable method of allowing a user to discover, select and connect to an image-rendering device 14 and associated projection device over a WLAN. First, at 302, the user launches the user interface program. Upon launch, the user interface program may detect and save the current WLAN settings on the user's computer so that they may be restored once the user has completed transmitting data to a selected projection device.

Next, at 304, the user interface program may display a list of projection devices from which the user may select a desired projection device with which to display a presentation. The list of projection devices may include the last number of projection devices accessed by the user's computer, or the projection devices currently detected over the WLAN, or both. The detection of projection devices over the WLAN is described in more detail in U.S. Provisional Patent Application Ser. No. 60/475,354, titled "SYSTEM AND METHOD FOR SCANNING, DISCOVERING AND CONFIGURING WIRELESS PROJECTOR IMAGE-RENDERING DEVICES" filed on Jun. 2, 2003 by Castaldi et al., the disclosure of which is hereby incorporated by reference.

Next, the user may examine the list of projection devices at 306 to determine whether a desired projection device is on the list. If the desired projection device is not shown on the list, then the desired projection device may be connected to a WLAN other than the one to which the user's computer is currently connected. In this case, the user may select at 308 to scan to detect any other WLANs on which the desired projection device may be located.

If no other WLANs are detected at 310, the user interface program may alert the user at 312 that no other WLANs are available. At this point, the user may return to the list of projection devices presented to the user at 304 to begin the projection device selection process anew.

If, however, other WLANs are detected at 310, the user may desire to scan the other WLANs to continue searching for the desired projection device. Thus, at 312, the user is given the option of attempting this scan. If the user opts to perform the scan, the user may be alerted that the scan will result in the loss of connectivity to the current WLAN.

If the user decides at this time not to connect to scan the other WLANs, the user may cancel this operation and return to the list of projection devices presented at 304. On the other hand, if the user elects at this point to connect to another of the detected WLANs, the user interface program scans all detected WLANs at 316. Any projection devices discovered in this scan is then added to the list of projection devices presented to the user at 304, and the user may again examine the list at 306 for a desired projector.

The list of projection devices presented to the user may include information regarding the status of each discovered projection device. For example, the list may show whether each listed projection device is on the current WLAN or another WLAN, and/or whether each listed projection device is currently in use.

Figure 10:
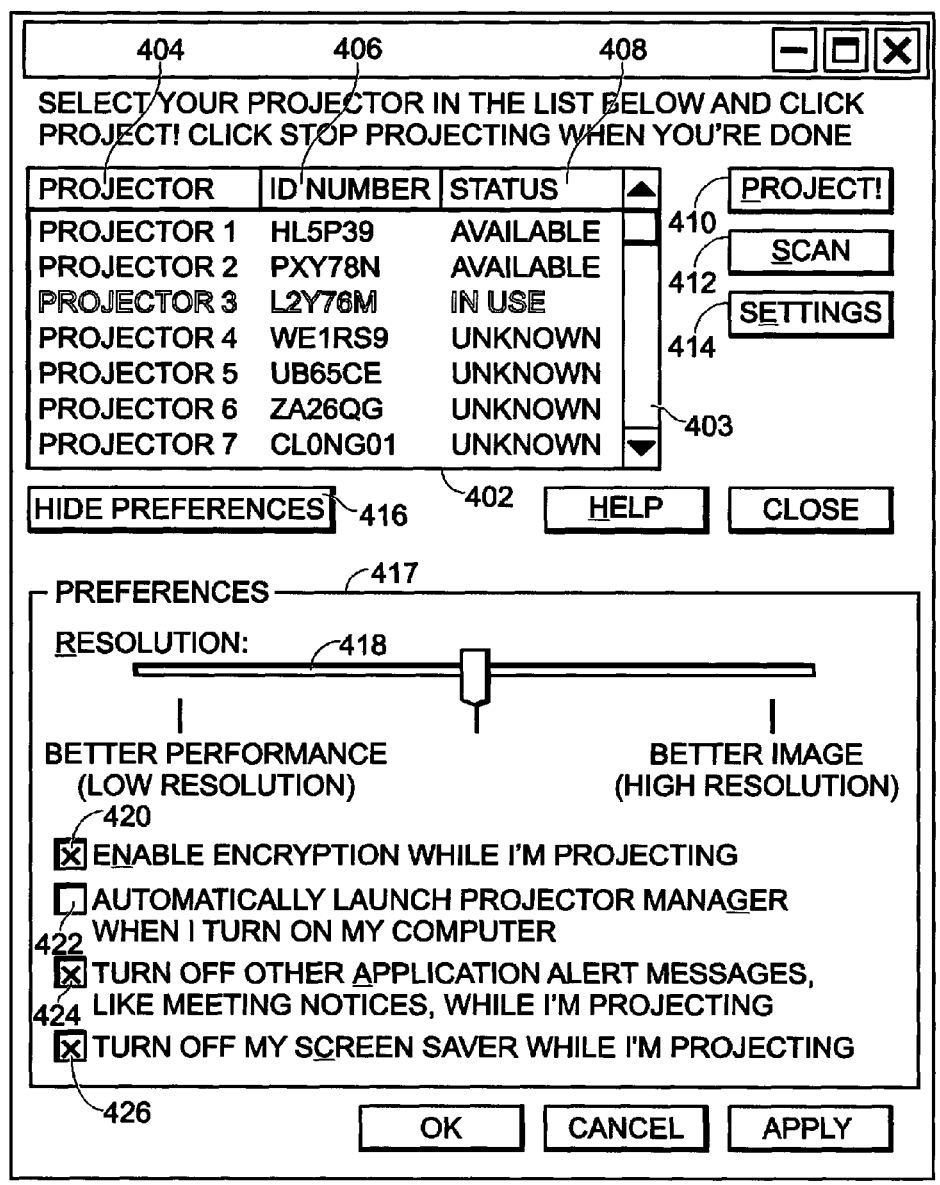
FIG. 10 is a view of an exemplary user interface window showing a plurality of projection devices that have been located according to the embodiment of FIG. 9.

The list of projection devices may be presented to the user in any suitable format. An example of a suitable format is shown in FIG. 10 as projection device list window 400. Projection device list window 400 includes a listing field 402 in which all projection devices detected are presented to the user. Listing field 402 may include a scroll bar 403 to allow more projection devices to be listed in the field than can be viewed in the field at one time.

The individual projection device listings in listing field 402 may include any desired information regarding a projection device, and may be arranged in any suitable manner, For example, listing field 402 may include an identification name column 404 in which each projector is identified to the user by its common name. Listing field 402 may also have an identification number column 406 in which the serial number or other identification number of each detected projection device is listed.

Additionally, listing field 402 may have a status column 408 that gives information regarding the status of each detected projection device. For example, if a projection device is on the same WLAN to which the user's computer is connected, the user's computer may detect whether the projection device is currently being used by another user, or whether the projection device is available for use. Where a selected projection device is currently in use, the user interface program may indicate this by showing the words "in use" in the status column next to the selected projection device. Likewise, where the selected projection device is not in use, the word "available" may be shown in the status column. On the other hand, where the selected projection device is on a different WLAN than the one to which the user's computer is currently connected, the word "unknown" may be shown in the status column next to the selected projector device, indicating that the user interface program is unable to determine the status of the selected projection device at that time.

Next, projection device list window 400 may include one or more buttons to allow a user to perform specific operations within the user interface program. For example, projection device list window 400 may include a "project" button 410. A user may present a presentation via a desired projection device by first selecting a projector device in listing field 402, and then selecting the "project" button 410. This operation is described in more detail below. Projection device list window 400 may also include a "scan" button 412 which may be selected by a user to scan for projection devices on other WLANs besides the one to which the user's computer is currently connected. Furthermore, projection device list window 400 may include other controls buttons, such lo as a settings button 414 for changing projector settings over the WLAN.

Projection device list window 400 may also be configured to allow a user to control other computer features from inside of the user interface program environment. For example, projection device list window 400 may include a preferences button 416 that may be selected to selectively reveal and hide a preferences sub-screen 417. Preferences sub-screen 417 may include such controls as a resolution control 418 that allows a user to adjust compression characteristics of the screen-scrape compression algorithm to balance desired speed and image quality characteristics. Preferences sub-screen 417 may also include controls allowing a user to enable encryption during projecting 420, to automatically launch the user interface program at computer start-up 422, to turn off other alert message applications during projecting 426, and to turn off screen saver programs during projecting 428.

Referring again to FIG. 9A, if a user finds at 306 that the desired projection device is in the list of discovered projection devices, the user may try to select the desired projection device. However, before allowing the user to use the projection device, the user interface program first checks at 318 to determine whether the desired projection device is available, meaning whether the projection device is both on the current WLAN and not in use by another user. If the desired projection device is available, then (referring again to FIG. 9B), the user may highlight the desired projector and then select, at 320, the "project" button 410. This may activate the screen-scrape (or other data transfer) program, causing an image of the user's desktop to be compressed and transmitted to the image-rendering device 14 associated with the selected projection device. Image-rendering device 14 then renders the image and provides the rendered image to the selected projection device for display at 322. The user's desktop is displayed by the selected projection device until the user selects at 324 a "stop projecting" control (not shown), which ends the projection session and may close the user interface program. At this point, the computer's previous WLAN settings may be restored at 325.

Referring again to FIG. 9A, if the desired projection device is not determined to be "available" at 318, then it is determined at 326 whether the projection device is "in use." If the projection device is determined to be "in use", the identification of the projection device may be shown in a different color, font, size, or other appearance characteristic in listing field 402 compared to the other projection devices shown in the listing field. This indicates to the user that that particular projection device may not be selected.

If, however, it is determined at 326 that the use state of the desired projector is unknown, this indicates that the desired projection device may be on a different WLAN than the one to which the user's computing device is currently connected. In this case, referring again to FIG. 9A the user may attempt to use the projection device by selecting the projection device and then selecting "project", as shown at 330. This may prompt the user interface program to attempt to detect other WLANs at 332. If no other WLANs are detected at 332, then an alert may be displayed to alert the user that the desired projection device is either out of range or turned off, as shown at 334. Then, the user may again examine the list of projection device shown at 304 to select another desired projection lo device.

On the other hand, if other WLANs are detected at 332, then the user interface program may connect to the other WLANs to search for the selected projection device on the other WLANs. Before connecting, the user may be alerted at 336 that the current network connection will be lost while the user interface program searches for the selected projector device. At this point, the user may choose to cancel the search. If the user so chooses, the user may be directed back to the list of projection devices shown at 304 to select another desired projection device.

If the user does not choose to cancel, then the user interface program disconnects from the current WLAN and connects to other detected WLANs to locate the desired projection device. If the desired projection device cannot be found, then the desired projector device is determined at 338 either to be off or out of range, and the user may be alerted as such at 334.

If the desired projection device can be found, the user interface program next determines whether the desired projection device is "available" at 340, meaning that it is not being used by another user. If the desired projection device is in use, then the user may be alerted of its status at 342, and may then be directed to the list of projection devices shown at 304 to select another desired projection device. If, however, the desired projection device is determined to be "available", then the user's computer is connected to the projector device via the image-rendering device 14 associated with the computing device, and the user may display a presentation as described above for steps 322, 324 and 325.

Where multiple image-rendering devices 14 and associated projection devices are connected to a single LAN (or WAN, WLAN, or any other type of network) software and/or firmware on each image-rendering device and/or projection device may be updated over the network from a single computer. For example, the user interface program may have an "update" functionality that manages software and/or firmware updates. The "update" functionality may detect all projection devices and image-rendering devices on the current network that are turned on and available. The "update" functionality may also detect various aspects of the status of the projection devices, including, but not limited to, the version number of any software and/or firmware stored on the projection devices.

Figure 11:
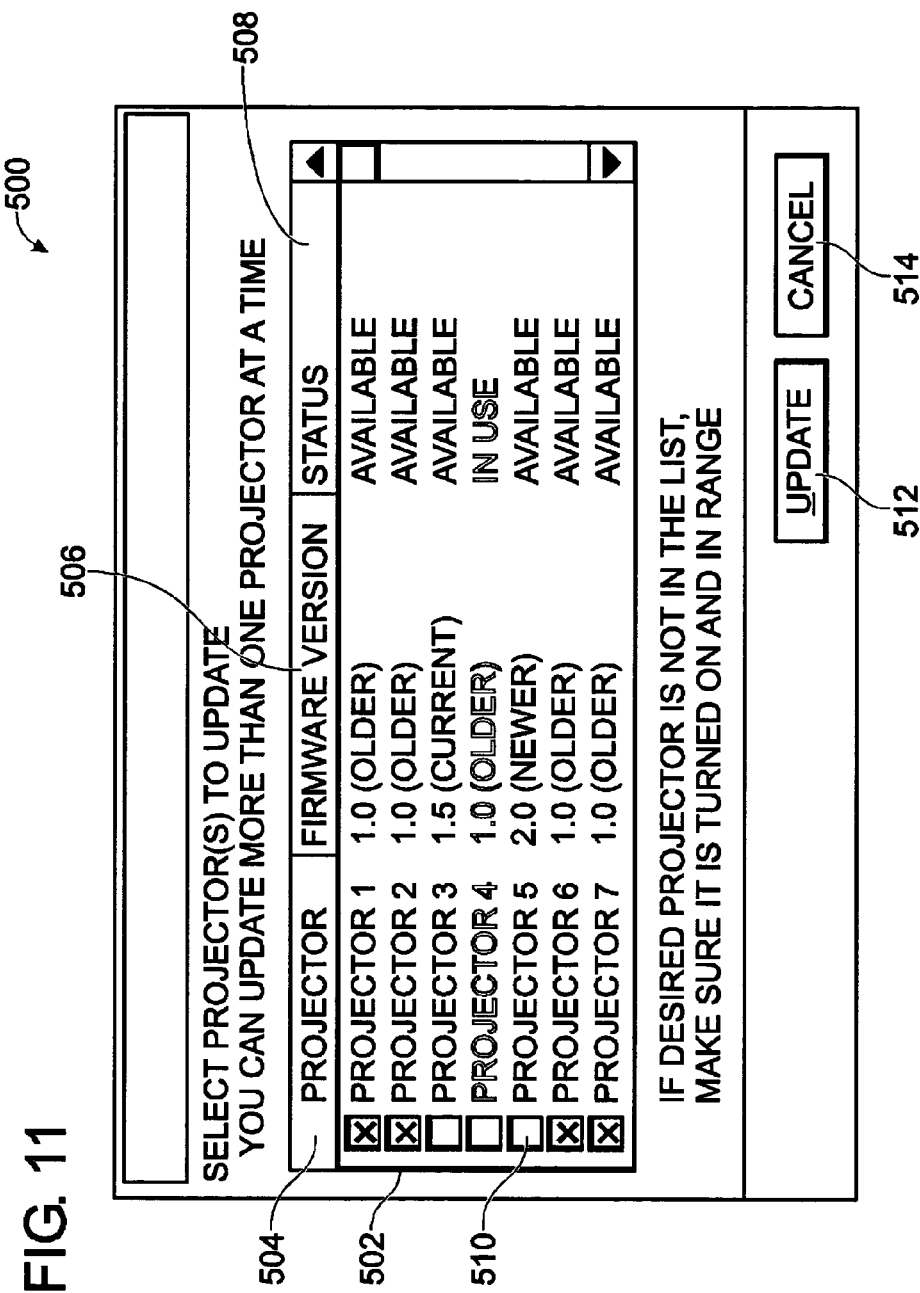
FIG. 11 is a view of an exemplary user interface window showing a plurality of projection devices that have been located on a wireless local area network for a software or firmware upgrade.

The user interface program may next display the list of the detected projection devices to a user. This list may be displayed in any suitable manner, and may contain any desired information regarding the identity and status of each detected projection device. FIG. 11 shows an example of a suitable update interface window generally at 500. Update interface window 500 includes a listing field 502 containing a list of all projection devices detected on the current network, arranged by name in a column 504. Alternatively, the projection devices may be identified by serial number, conference room name or number, etc.

Listing field 502 also may show a version number (or other identifier) of the firmware and/or software currently installed on each detected projector device, as indicated at 506. The depicted listing field 502 shows only a firmware version for each projection device. However, it will be appreciated that the listing field may show a software version, or a both a software and a firmware version. Additionally, listing field 502 may show whether a detected projection device is in use, as indicated at 508.

Next, to update the firmware and/or software, a user may first select the projection devices that the user desires to update via a checkbox 510 associated with each listed projection device. For example, in the depicted embodiment, the user may wish to update only those projection devices which are running the oldest firmware version. Thus, the user may select projectors 1, 2, 6 and 7 by checking the box next to each of these projection devices. The user is not able to select projector 4 because it is indicated to be in use. Next, the user may simply select the update button 512 to begin updating the firmware on each listed projection device. Alternatively, a user may cancel the updating process simply by selecting a "cancel" button 514. After the updating process has been completed, the user interface program may update the list shown in FIG. 11 by indicating whether the update was successful or unsuccessful under status column 508 (not shown).

While various alternative embodiments and arrangements of an image display system have been shown and described above, it will be appreciated by those of skill in the art that numerous other embodiments, arrangements and modifications are possible and are within the scope of the invention. For example, it should be noted that image-rendering device 14 (or 214) may be detachable from image projector 12 or permanently integrated within image projector 12. Moreover, image-rendering device 14 may include multiple image receivers 24 and/or a plurality of peripheral device connectors 36.

Furthermore, although the present disclosure includes specific embodiments, specific embodiments are not to be considered in a limiting sense, because numerous variations are possible. The subject matter of the present disclosure includes all novel and nonobvious combinations and sub-combinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. An image-rendering device for a projection device, the image-rendering device comprising:
   a body;
   a connector movably coupled to the body, wherein the connector is configured to electrically and structurally couple the body to the projection device such that the body is movable between at least a first position and a second position relative to the connector;
   an image receiver associated with the body, wherein the image receiver is adapted to alternatively receive a first interchangeable data transfer device and a second interchangeable data transfer device, and wherein each interchangeable data transfer device is configured to allow transfer of data representing an image to the image-rendering device;
   a processor disposed within the body; and
   memory disposed within the body and in electrical communication with the processor, wherein the memory includes a set of instructions executable by the processor to render the image from the data and to provide the image to the projection device.

2. The image-rendering device of claim 1, wherein the connector is pivotally coupled to the body with a hinged connection.

3. The image-rendering device of claim 1, wherein the image receiver includes an opening adapted to receive a wireless network card.

4. The image-rendering device of claim 1, further comprising a removable cover configured to cover the image receiver.

5. The image-rendering device of claim 2, wherein the hinged connection is pivotally adjustable over a continuous range of positions.

6. The image-rendering device of claim 2, wherein the hinged connection has indexed positions.

7. The image-rendering device of claim 4, wherein the removable cover is at least partially transparent.

8. An image-rendering device for a projection device, the image-rendering device comprising:
- a body;
- a connector pivotally connected to the body, wherein the connector is configured to electrically and structurally couple the body to the projection device; and
- an image receiver associated with the body, wherein the image receiver is adapted to alternatively receive a first interchangeable data transfer device and a second interchangeable data transfer device.

9. The image-rendering device of claim 8, wherein the connector is pivotally connected to the body with a hinge.

10. The image-rendering device of claim 9, wherein the hinge is pivotally adjustable over a continuous range of positions.

11. The image-rendering device of claim 9, wherein the hinge has indexed positions.

12. The image-rendering device of claim 8, wherein the first interchangeable data transfer device is a wireless network device.

13. The image-rendering device of claim 8, further comprising a removable cover configured to cover the image receiver.

14. A projection device system, comprising:
- a projection device configured to project an image onto a viewing surface; and
- a wireless image transfer device pivotally coupled with the projection device, wherein the wireless image transfer device is adapted to wirelessly receive image data and to transfer the image data to the projection device, wherein the wireless image transfer device is pivotally coupled to the projection device via an image rendering device configured to receive the image data from the wireless image transfer device and to render the image for protection by the projection device, wherein the wireless image transfer device is a wireless communications card removably coupled to the image rendering device, and wherein the image rendering device is configured to accept attachment of at least one image transfer device other than the wireless image transfer device.

15. A projection device system, comprising:
- a projection device configured to project an image onto a viewing surface; and
- a wireless image transfer device pivotally coupled with the projection device and selectively detachable from the said projection device, wherein the wireless image transfer device is adapted to wirelessly and automatically receive image data from an independent source and to transfer the image data to the projection device.

16. The projection device system of claim 15, wherein the wireless image transfer device is pivotally coupled to the projection device via an image rendering device configured to receive the image data from the wireless image transfer device and to render the image for projection by the projection device.

17. The projection device system of claim 15, wherein the image transfer device is pivotally attached to the projection device.

18. The projection device system of claim 15, wherein the image transfer device includes a body pivotally coupled to a connector for connecting the body to the projection device.

* * * * *

UNITED STATES PATENT AND TRADEMARK OFFICE
CERTIFICATE OF CORRECTION

| | |
|---|---|
| PATENT NO. | : 7,044,605 B2 |
| APPLICATION NO. | : 10/453865 |
| DATED | : May 16, 2006 |
| INVENTOR(S) | : Jorell A. Olson et al. |

It is certified that error appears in the above-identified patent and that said Letters Patent is hereby corrected as shown below:

Item (73), On Title Page, Col. 1 delete "Witsonville, OR" and insert --Wilsonville, OR-- therefor.

In Column 16, line 12, delete "for protection by" and insert --for projection by-- therefor.

Signed and Sealed this

Nineteenth Day of September, 2006

JON W. DUDAS
*Director of the United States Patent and Trademark Office*